US010811945B2

(12) United States Patent
Uddin et al.

(10) Patent No.: US 10,811,945 B2
(45) Date of Patent: Oct. 20, 2020

(54) PERMANENT MAGNET MACHINE INCLUDING FERROMAGNETIC COMPONENTS FOR EXTERNAL FIELD WEAKENING AND METHOD OF CONSTRUCTING

(71) Applicant: Schaeffler Technologies AG & Co. KG, Herzogenaurach (DE)

(72) Inventors: Md. Wasi Uddin, Akron, OH (US); Gregory Heeke, Wosster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 293 days.

(21) Appl. No.: 15/686,213

(22) Filed: Aug. 25, 2017

(65) Prior Publication Data

US 2019/0068037 A1   Feb. 28, 2019

(51) Int. Cl.
| | |
|---|---|
| *H02K 21/02* | (2006.01) |
| *H02K 15/03* | (2006.01) |
| *H02K 1/27* | (2006.01) |
| *H02K 5/10* | (2006.01) |

(52) U.S. Cl.
CPC ........... *H02K 21/028* (2013.01); *H02K 1/272* (2013.01); *H02K 1/278* (2013.01); *H02K 15/03* (2013.01); *H02K 21/029* (2013.01); *H02K 5/10* (2013.01)

(58) Field of Classification Search
CPC ........ H02K 1/272; H02K 1/278; H02K 15/03; H02K 21/029; H02K 5/10; H02K 21/028; H02K 1/2706; H02K 1/28; H02K 21/021

USPC .............. 310/156.16, 156.17, 191, 209
See application file for complete search history.

(56) References Cited

U.S. PATENT DOCUMENTS

| | | | | |
|---|---|---|---|---|
| 2,606,219 A | * | 8/1952 | Thomas | H02K 1/2733 310/156.17 |
| 5,408,824 A | * | 4/1995 | Schlote | F01D 1/32 416/21 |
| 5,455,473 A | | 10/1995 | Lipo et al. | |
| 5,551,918 A | * | 9/1996 | Jones | F16D 3/725 464/147 |
| 6,078,121 A | * | 6/2000 | Poag | H02K 1/278 29/596 |
| 6,181,047 B1 | * | 1/2001 | Nitta | D06F 37/304 310/216.001 |
| 7,864,015 B2 | * | 1/2011 | Hansen | H01F 17/06 336/200 |

(Continued)

FOREIGN PATENT DOCUMENTS

| | | | | |
|---|---|---|---|---|
| CN | 1996740 A | * | 11/2007 | ............. H02N 11/00 |
| CN | 203301263 U | * | 11/2013 | ............... H02K 1/22 |
| WO | WO 2012/079068 | | 6/2012 | |

*Primary Examiner* — Emily P Pham
(74) *Attorney, Agent, or Firm* — Davidson, Davidson & Kappel, LLC

(57) ABSTRACT

The permanent magnet machine includes a stator, a rotor inside the stator and a ferromagnetic component fixed axially movably to the rotor. The ferromagnetic component is configured for actuating axially toward the rotor to weaken a magnetic field of the rotor. The method of constructing a permanent magnet machine includes providing a stator and a rotor inside the stator; and axially movably fixing a ferromagnetic component to the rotor such that the ferromagnetic component is configured for actuating axially toward the rotor to weaken a magnetic field of the rotor.

20 Claims, 3 Drawing Sheets

(56) References Cited

U.S. PATENT DOCUMENTS

| | | | |
|---|---|---|---|
| 8,018,100 B2* | 9/2011 | Popov | H01F 41/0273 310/51 |
| 8,288,982 B2 | 10/2012 | Kauppi | |
| 2005/0012419 A1* | 1/2005 | Kometani | H02K 1/278 310/156.47 |
| 2007/0046138 A1* | 3/2007 | Ooiwa | H02K 15/03 310/263 |
| 2008/0265702 A1* | 10/2008 | Yeh | H02K 21/026 310/90 |
| 2011/0074238 A1* | 3/2011 | Ai | H02K 1/30 310/191 |
| 2011/0285243 A1* | 11/2011 | Taniguchi | H02K 1/2746 310/216.074 |
| 2012/0126740 A1* | 5/2012 | Kauppi | H02K 21/028 318/538 |
| 2012/0206001 A1* | 8/2012 | Lee | H02K 1/146 310/112 |
| 2014/0139079 A1* | 5/2014 | Kato | H02K 21/16 310/68 B |
| 2014/0191596 A1* | 7/2014 | Wu | H02K 1/274 310/52 |
| 2014/0219852 A1* | 8/2014 | Forssell | F04C 2/103 418/61.3 |
| 2015/0171683 A1* | 6/2015 | Kim | H02K 1/2773 310/156.53 |
| 2017/0338726 A1* | 11/2017 | Gandel | H02K 21/16 |

\* cited by examiner

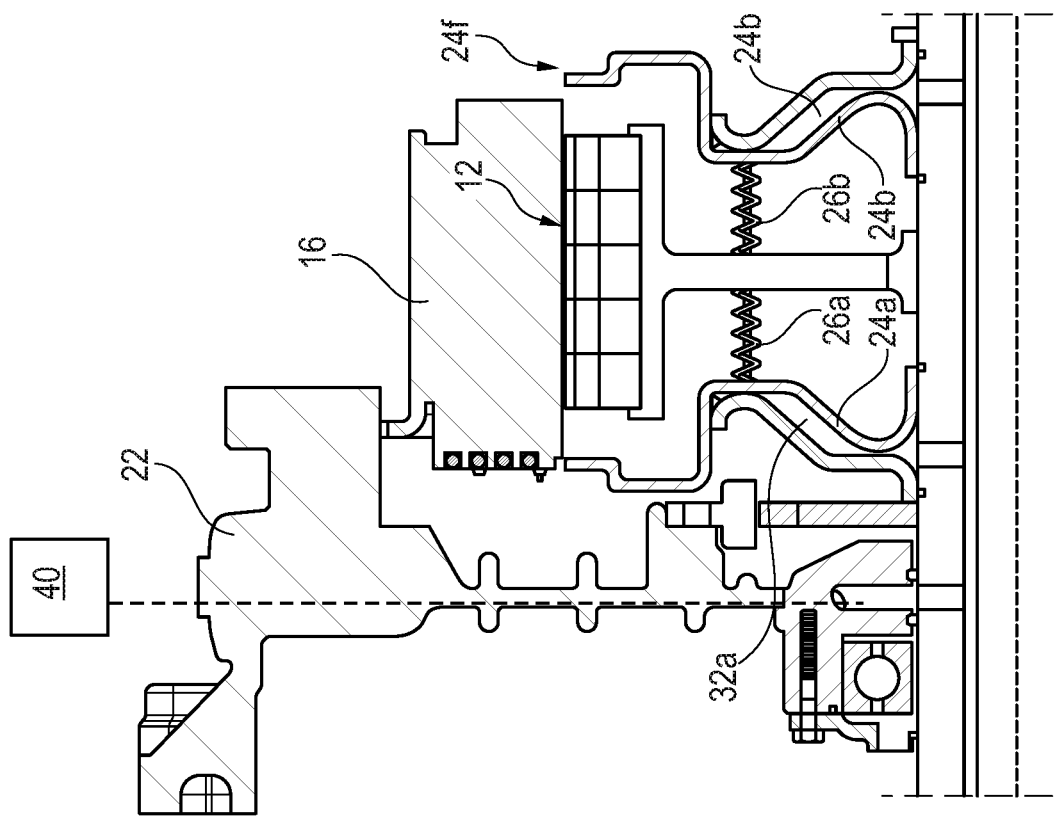
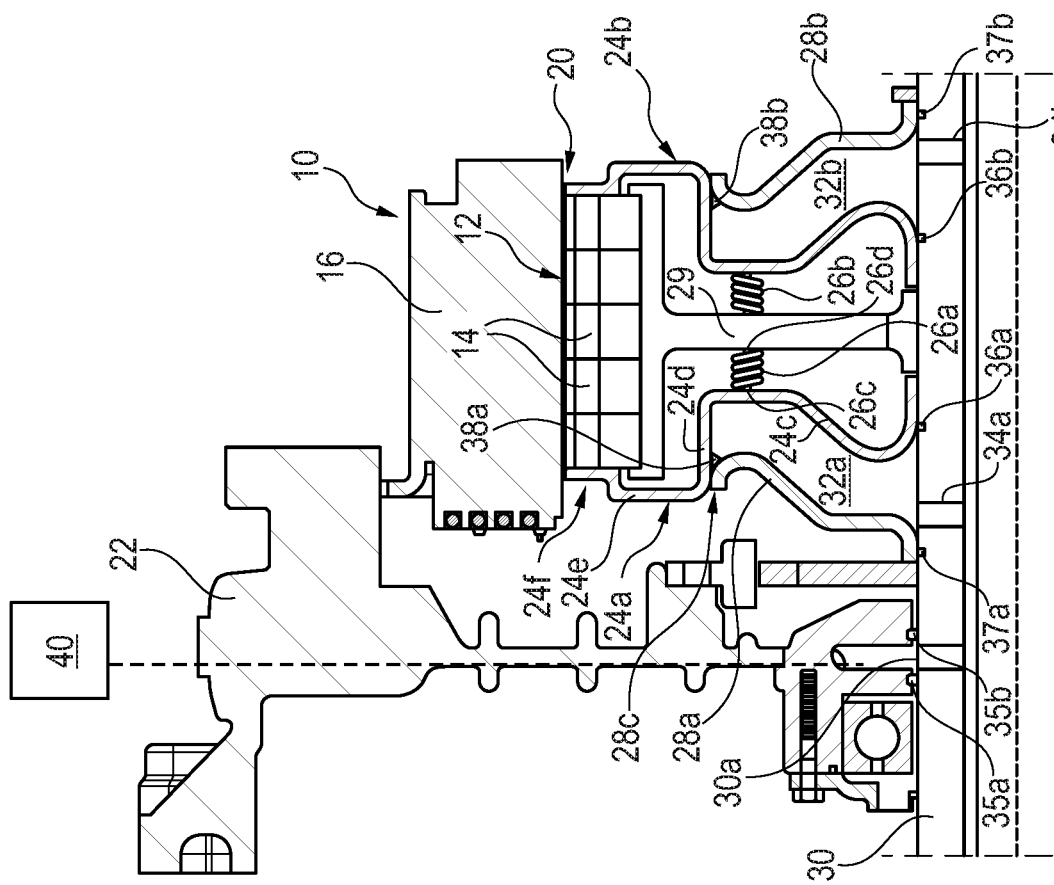

PERMANENT MAGNET MACHINE INCLUDING FERROMAGNETIC COMPONENTS FOR EXTERNAL FIELD WEAKENING AND METHOD OF CONSTRUCTING

The present disclosure relates generally to permanent magnet machines and more specifically to field weakening of permanent magnet machines.

BACKGROUND

A common problem of the permanent magnet (PM) machines, e.g., PM electric motors, is extending the constant power range. Extending the constant power range is performed by applying rotor magnetic field weakening current which does not contribute to the torque directly. Application of the field weakening current reduces efficiency of the permanent magnet machine at high speed. Another problem of the permanent magnet machine is at a very high speed, dangerously high line-to-line voltages can be created, which might exceed the DC link voltage of the inverter, making the inverter act as a rectifier and increasing the DC link voltage to dangerously high levels.

U.S. Pat. No. 5,455,473 and WO 2012/079068 disclose designs where a stator has a permanent magnet. The field weakening is performed from the stator side. U.S. Pat. No. 8,288,982 discloses performing field weakening using rings affecting both the stator and the rotor.

SUMMARY OF THE INVENTION

A permanent magnet machine is provided. The permanent magnet machine includes a stator, a rotor inside the stator and a ferromagnetic component fixed axially movably to the rotor. The ferromagnetic component is configured for actuating axially toward the rotor to weaken a magnetic field of the rotor.

Embodiments of the permanent magnet machine may include one or more of the following features:

the ferromagnetic component is a ferromagnetic plate;

an axially fixed support, the ferromagnetic plate being axially slidable along the axially fixed support;

the axially fixed support and the axially movable ferromagnetic plate define a cavity axially therebetween, the cavity being configured such that an increase in pressure therein forces the ferromagnetic component toward the rotor;

a shaft and a rotor carrier nonrotatably fixing the rotor to the shaft;

at least one elastic element applying a preloading force to the movable ferromagnetic plate to hold the movable ferromagnetic plate axially away from the rotor carrier, the increase in pressure in the cavity overcoming the preloading force;

the shaft includes at least one fluid line configured for supplying fluid to the cavity;

a further ferromagnetic component fixed axially movably to the rotor, the ferromagnetic component being fixed to a first axial end of the rotor and the further ferromagnetic component being fixed to a second axial end of the rotor, the further ferromagnetic component configured for actuating axially toward the rotor to weaken the magnetic field of the rotor.

A method of forming a permanent magnet machine is also provided. The method includes providing a stator and a rotor inside the stator; and axially movably fixing a ferromagnetic component to the rotor such that the ferromagnetic component is configured for actuating axially toward the rotor to weaken a magnetic field of the rotor.

Embodiments of the method may include one or more of the following features:

the ferromagnetic component is a ferromagnetic plate;

fixing a carrier to the rotor such that the carrier is axially fixed with respect to the rotor and rotatable about a center axis of the permanent magnet machine with the rotor, the carrier attaching the axially movable ferromagnetic plate to the rotor for rotation about the center axis with the rotor;

arranging a support to define a cavity axially between the support and the axially movable ferromagnetic plate, the cavity being configured such that an increase in pressure therein forces the axially movable ferromagnetic plate toward the rotor;

providing at least one elastic element applying a preloading force to the axially movable ferromagnetic plate to hold the axially movable ferromagnetic plate axially away from the rotor, the increase in pressure in the cavity overcoming the preloading force;

providing a shaft nonrotatably fixed to the rotor, the shaft including at least one fluid line configured for supplying fluid to the cavity.

BRIEF DESCRIPTION OF THE DRAWINGS

The present invention is described below by reference to the following drawings, in which:

FIGS. 1a, 1b show cross-sectional side views of a PM machine 10 in accordance with an embodiment of the present invention;

DETAILED DESCRIPTION

In PM machines, e.g., PM electric motors, increasing the speed increases the back electromotive force (emf). The speed at which the back emf increases to a value equal to an input voltage is called a base speed, and at speeds more than the base speed it is not possible to push q axis current (aka, torque current) into the PM machines, causing the torque to drop drastically. Accordingly, PM machines need to weaken the airgap flux by applying negative d axis current (aka, flux current). By weakening the airgap flux, more torque current can be pushed to the PM machine hence increasing torque. Application of the flux current along with the torque current increases the total current into the PM machine, where the total current is the vector sum of the flux current and torque current. As the total current should not increase more than the rated current due to thermal issues, the flux current excitation has to be limited. The introduction of the negative flux current increases the loss in the high speed operation of the PM machine. For hybrid automatic transmissions, it is not known to apply the automatic transmission fluid (ATF) for field weakening actuation.

Field weakening with flux current is a common phenomenon in the PM machines. If the field weakening operation could be performed without applying negative flux current and applying the field weakening externally, similar torque increasing effect can be observed. The efficiency of the PM motor would increase. In addition, if the negative flux current is introduced with the external field weakening, wider speed range may be observed.

Another problem is increased back emf at high speed without any current excitation produces high back emf. The high line-to-line back emf may create a fault condition in the inverter side and hazardous high voltage may occur at the DC link side.

The present disclosure provides that the rotor magnet fluxes can be shorted with magnetic rings at the end of the rotor. The magnetic rings can be rotating with the same speed as the rotor itself. The degree of shorting the magnets can be controlled by a set of springs and a hydraulic piston.

Figure 2:
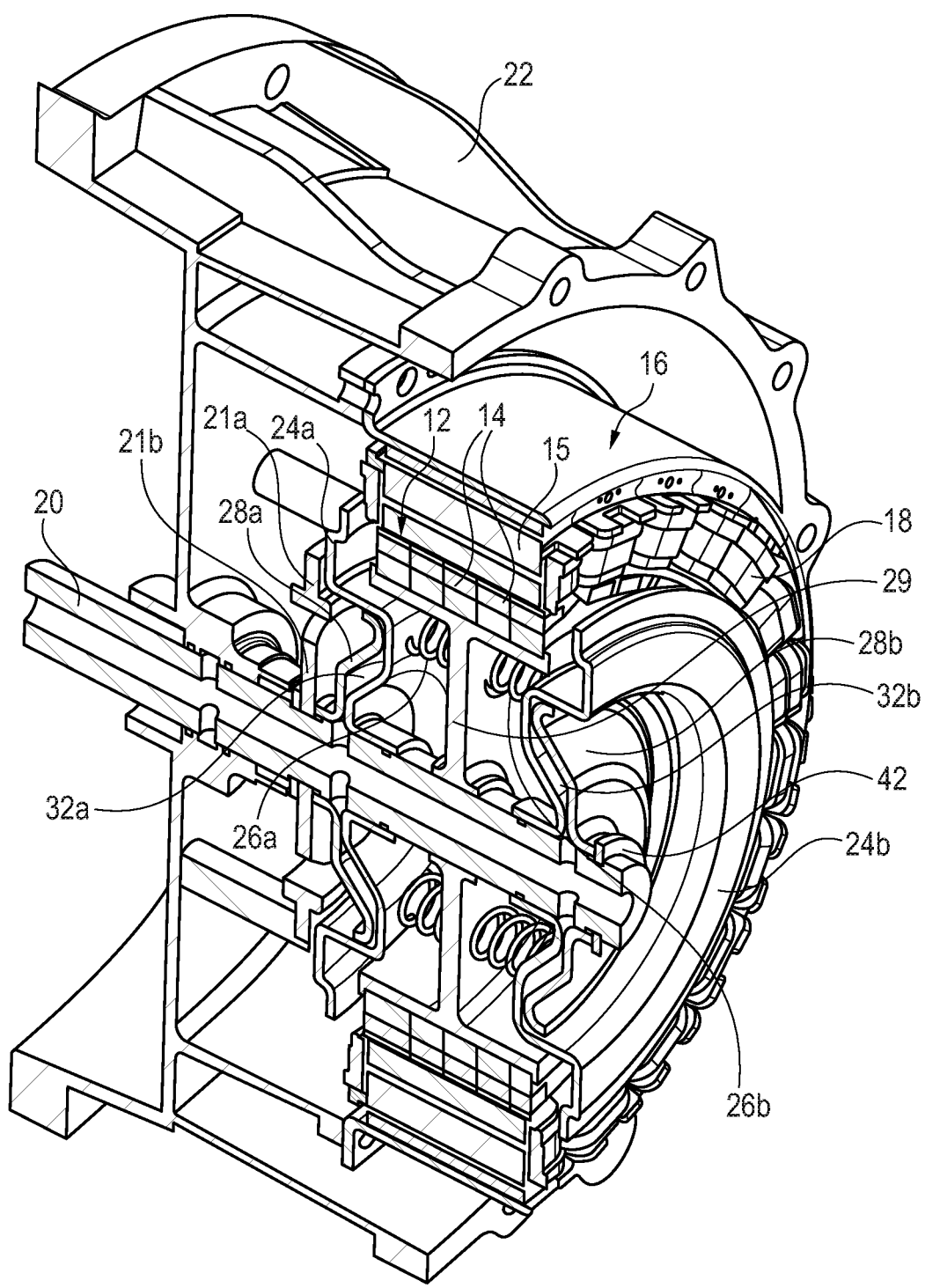
FIG. 2 shows a cross-sectional side view of the PM machine shown in FIGS. 1a and 1b.
Figure 3:
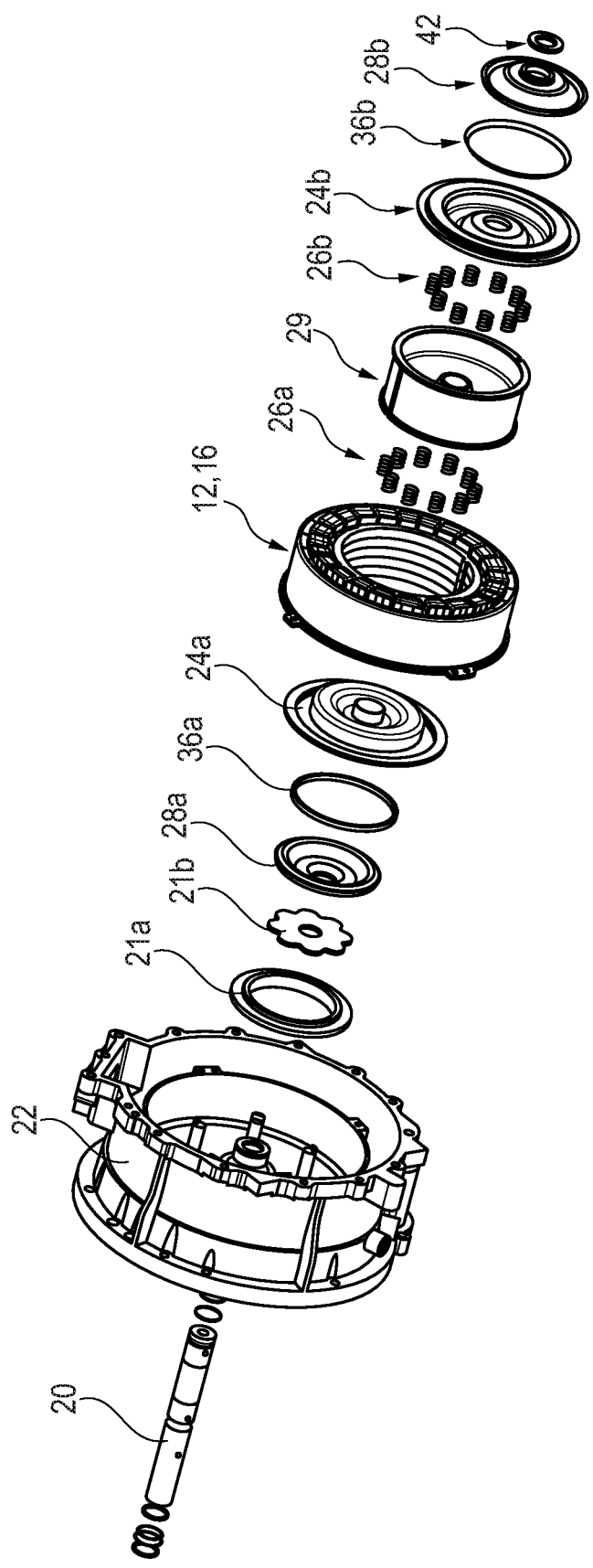
FIG. 3 shows an exploded view of PM machine shown in FIGS. 1a and 1b.

FIGS. 1a, 1b show cross-sectional side views of a PM machine 10 in accordance with an embodiment of the present invention. FIG. 2 shows a cross-sectional side view of PM machine 10. FIG. 3 shows an exploded view of PM machine 10. PM machine 10 includes a rotating rotor 12, which contains permanent magnets 14, and a fixed stator 16, which contains windings 18 (FIGS. 2 and 3) and is fixed to a housing 22. The winding can be of distributed or concentric type. Stator 16 is arranged radially outside of rotor 12 and surrounds rotor 12 coaxially with respect to a center axis CA. Unless otherwise specified, the terms axially, radially and circumferentially as used herein are used with respect to center axis CA. Rotor 12 and stator 16 are spaced apart by an airgap 20 between rotor 12 and stator 16. Rotor 12 is non-rotatably fixed to by a carrier 29 to a shaft 30, which rotates about center axis CA. Carrier 29, which is fixed in place axially on shaft 30, is non-rotatably connected to an inner circumferential surface of rotor 12 and an outer circumferential surface of shaft 30 such that rotor 12 and shaft 30 rotate together about center axis CA. Shaft 30 is sealingly rotatable with respect to housing 22 via seals 35a, 35b.

Stator 16 and housing 22 do not rotate. Stator 16 has many poles 15 with windings 18 around the poles 15. Magnets 14 produce magnetic flux that goes to stator windings 18 through the airgap 20 so that the flux creates a back emf voltage in the stator windings 18. The back emf is proportional to the flux through the stator 16.

PM machine 10 has a resolver assembly which has two parts—one being a resolver stator 21a and the other being a resolver rotor 21b. Resolver stator 21a does not rotate and is attached to housing 22. Resolver rotor 21b is attached to shaft 30 and rotates with the rotation of rotor 12.

Two ferromagnetic components—in this embodiment are a first ferromagnetic plate 24a and a second ferromagnetic plate 24b, which in this embodiment are formed as continuous rings, are provided at opposite axial ends of PM machine 10. The ferromagnetic plates may be for example formed of iron. Radially outer ends 24f of plates 24a, 24b are both axially aligned with magnets 14—i.e., the radially outer ends 24f of plates 24a, 24b are positioned at a same radial distance from center axis CA as magnets 14.

Each movable plate 24a, 24b is provided with at least respective elastic element. In the embodiment of FIG. 1, the at least one elastic element is in the form of an array springs 26a, 26b. Movable plate 24a is provided with an array of circumferentially spaced springs 26a and movable plate 24a is provided with an array of circumferentially spaced springs 26a. Each of springs 26a, 26b contacts an inward facing surface of the respective plate 24a, 24b and a respective radially extending surface of carrier 29. The movable plates 24a, 24b are configured to move axially towards and away from the rotor 12, with the inner circumference surface of each plate 24a, 24b being sealingly slidable, by a respective seal 36a, 36b along the outer circumferential surface of shaft 30.

Each of movable plates 24a, 24b includes a radially inner radially extending portion 24c defining the inner circumference surface of the respective plate 24a, 24b and to which the respective spring 26a, 26b is attached. An outer radial end of portion 24c joins an axially extending intermediate section 24d, which extends axially outward away from carrier 29 to join a radially outer radially extending portion 24e, which includes outer radial end 24f that contacts magnets 14.

PM machine 10 also includes axially stationary supports. In the embodiment of FIGS. 1a, 1b, supports are in the form of axially stationary plates 28a, 28b that are axially offset from carrier 29 further away from rotor 12 than inner portions 24c of movable plate 24a, 24b. Plates 28a, 28b are fixed axially in place on the outer circumferential surface of shaft 30 and are sealed with respect to shaft by seal rings 37a, 37b. Axially stationary plates 28a, 28b each include a radially outer end 28c sealing contacting an inner circumferential surface of axially extending intermediate portion 24e via respective seals 38a, 38b such that ends 28c are sealingly axially slidable along the inner circumferential surface of axially extending intermediate portion 24e.

Each spring 26a, 26b includes a first end 26c fixed to carrier 29 and a second send 26d fixed to portion 24c of the respective plate 24a, 24b. Plates 24a, 24b each are axially slidable along the respective stationary plate 28a, 28b, to axially expand and compress the respective springs 26a, 26b. Ends 26c of springs 26a move axially with the respective plate 24a, 24b while ends 26d are fixed to carrier 29.

Between each movable plate 24a, 24b and the respective stationary plate 28a, 28b, on the opposite sides of plates 24a, 24b as the respective springs 26a, 26b, a respective cavity 32a, 32b is formed where the hydraulic ATF fluid can be supplied through shaft lines 34a, 34b inside the shaft 30. The ATF is supplied from the automatic transmission pumps 40 and enters into shaft 30 via an inlet 30a. The fluid lines 34a, 34b reach to the cavities 32a, 32b on both sides of rotor 12 and supply the cavities 32a, 32b with ATF. The ATF then presses movable plates 24a, 24b axially toward rotor 12, with the pressing force of plates 24a, 24b, which depends on the ATF pressure, overcome the preloading force of the springs 26a, 26b to compress springs 26a, 26b.

When the PM machine 10 is operating and rotor 12 is rotating, ATF is supplied from pumps 40 and radially outward through shaft lines 34a, 34b to the cavities 32a, 32b on both of the ends of the rotor 12 when field weakening is needed. The ATF is supplied inside the cavity 32a, 28b with a pressure from the pumps 40. The pressure can also be produced from the centrifugal force of the oil. In any case of pump pressure or centrifugal force, a pressure acts on the plates 24a, 24b. The plates 24a, 24b are moved away from radially extending portions 28d and towards rotor 12 from both ends of rotor 12. If the ferromagnetic iron plate 24a, 24b comes close to the end of the rotor 12, i.e., close to magnets 14, the rotor flux is shorted by plates 24a, 24b and the rotor field is weakened. The flux of the rotor 12 then passes through the plates 24a, 24b to be weakened in the airgap 20 between stator 16 and rotor 12.

FIG. 1a shows springs 26a, 26b being compressed by the fluid in cavities 32a, 32b such that ends 24f of plates 24a, 24b contact axial ends of rotor 12 such that a magnetic field of the rotor 12 is weakened. Touching the rotor 12 shorts the magnetic flux and the magnetic flux at the end of the rotor 12 crosses through the field weakening plates 24a, 24b in the axial direction, instead of moving up the stator winding 18. The stator winding gets less flux and less flux is beneficial at high speed operation. In FIG. 1a, plate 28a axially abuts resolver rotor 21*b* and plate 28*b* axially abuts snap ring 42. FIG. 1*b* shows springs 26*a*, 26*b* being in an expanded orientation such that ends 24*f* of plates 24*a*, 24*b* are held axially away from the axial ends of rotor 12 and plates 24*a*, 24*b* due not impact the magnetic field of rotor 12. In FIG. 1*b*, the fluid pressure in cavities 32*a*, 32*b* is not sufficient to compress springs 26*a*, 26*b*.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

10 permanent magnet machine
12 rotor
14 permanent magnets
15 poles
16 stator
18 stator winding
20 airgap
21*a* resolver stator
21*b* resolver rotor
22 housing
24*a*, 24*b* axially movable plates
24*c* radially inner radially extending portion
24*d* axially extending intermediate section
24*e* radially outer radially extending portion
24*f* radially outer end
26*a*, 26*b* springs
28*a*, 28*b* axially stationary plates
28*c* radially outer end
shaft
30*a* fluid inlet
32*a*, 32*b* pressure cavities
34*a*, 34*b* shaft fluid lines
35*a*, 35*b* seals
36*a*, 36*b* seals
37*a*, 37*b* seals
38*a*, 38*b* seals
40 pumps
42 snap ring

What is claimed is:

1. A permanent magnet machine comprising:
   a stator;
   a rotor inside the stator; and
   a ferromagnetic component fixed axially movably to the rotor, the ferromagnetic component being configured for actuating axially toward the rotor to weaken a magnetic field of the rotor, a portion of the ferromagnetic component being axially aligned with magnets of the rotor.

2. The permanent magnet machine as recited in claim 1 wherein the ferromagnetic component is a ferromagnetic plate.

3. The permanent magnet machine as recited in claim 2 further comprising an axially fixed support, the ferromagnetic plate being axially slidable along the axially fixed support.

4. The permanent magnet machine as recited in claim 3 wherein the axially fixed support and the ferromagnetic plate define a cavity axially therebetween, the cavity being configured such that an increase in pressure therein forces the ferromagnetic plate toward the rotor.

5. The permanent magnet machine as recited in claim 4 further comprising a shaft and a rotor carrier nonrotatably fixing the rotor to the shaft.

6. The permanent magnet machine as recited in claim 5 further comprising at least one elastic element applying a preloading force to the ferromagnetic plate to hold the ferromagnetic plate axially away from the rotor carrier, the increase in pressure in the cavity overcoming the preloading force.

7. The permanent magnet machine as recited in claim 5 wherein the shaft includes at least one fluid line configured for supplying fluid to the cavity.

8. The permanent magnet machine as recited in claim 1 further comprising a further ferromagnetic component fixed axially movably to the rotor, the ferromagnetic component positioned at a first axial end of the rotor and the further ferromagnetic component positioned at a second axial end of the rotor, the further ferromagnetic component configured for actuating axially toward the rotor to weaken the magnetic field of the rotor.

9. A method of constructing a permanent magnet machine comprising:
   providing a stator and a rotor inside the stator; and
   axially movably fixing a ferromagnetic component to the rotor such that the ferromagnetic component is configured for actuating axially toward the rotor to weaken a magnetic field of the rotor, a portion of the ferromagnetic component being axially aligned with magnets of the rotor.

10. The method as recited in claim 9 wherein the ferromagnetic component is a ferromagnetic plate.

11. The method as recited in claim 10 further comprising fixing a carrier to the rotor such that the carrier is axially fixed with respect to the rotor and rotatable about a center axis of the permanent magnet machine with the rotor, the carrier attaching the ferromagnetic plate to the rotor for rotation about the center axis with the rotor.

12. The method as recited in claim 10 further comprising arranging a support to define a cavity axially between the support and the ferromagnetic plate, the cavity being configured such that an increase in pressure therein forces the ferromagnetic plate toward the rotor.

13. The method as recited in claim 12 further comprising providing at least one elastic element applying a preloading force to the ferromagnetic plate to hold the ferromagnetic plate axially away from the rotor, the increase in pressure in the cavity overcoming the preloading force.

14. The method as recited in claim 12 further comprising providing a shaft nonrotatably fixed to the rotor, the shaft including at least one fluid line configured for supplying fluid to the cavity.

15. The permanent magnet machine as recited in claim 1 wherein the portion of the ferromagnetic component axially aligned with magnets of the rotor is a radially outer end of the ferromagnetic component.

16. The method as recited in claim 9 wherein the portion of the ferromagnetic component axially aligned with magnets of the rotor is a radially outer end of the ferromagnetic component.

17. A permanent magnet machine comprising:
   a stator;
   a rotor inside the stator;
   a ferromagnetic component fixed axially movably to the rotor, the ferromagnetic component being configured for actuating axially toward the rotor to weaken a magnetic field of the rotor, the ferromagnetic component is a ferromagnetic plate; and an axially fixed support, the ferromagnetic plate being axially slidable along the axially fixed support, the axially fixed support and the ferromagnetic plate defining a cavity axially therebetween, the cavity being configured such that an increase in pressure therein forces the ferromagnetic plate toward the rotor.

18. The permanent magnet machine as recited in claim 17 further comprising a shaft and a rotor carrier nonrotatably fixing the rotor to the shaft.

19. The permanent magnet machine as recited in claim 18 further comprising at least one elastic element applying a preloading force to the ferromagnetic plate to hold the ferromagnetic plate axially away from the rotor carrier, the increase in pressure in the cavity overcoming the preloading force.

20. The permanent magnet machine as recited in claim 18 wherein the shaft includes at least one fluid line configured for supplying fluid to the cavity.

* * * * *